(12) United States Patent
Eshghi et al.

(10) Patent No.: US 8,560,512 B2
(45) Date of Patent: Oct. 15, 2013

(54) FINDING MATCHING LOCATIONS, TRAJECTORIES OR ATTRIBUTES WHILE MAINTAINING PRIVACY OF NON-MATCHING INFORMATION

(75) Inventors: Kave Eshghi, Los Altos, CA (US); Henri Jacques Suermondt, Sunnyvale, CA (US); Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2446 days.

(21) Appl. No.: 10/199,664

(22) Filed: Jul. 18, 2002

(65) Prior Publication Data

US 2004/0015706 A1    Jan. 22, 2004

(51) Int. Cl.
*G06F 17/30* (2006.01)

(52) U.S. Cl.
USPC ............................................. 707/706

(58) Field of Classification Search
USPC ............ 707/100; 701/209; 713/182; 340/988
See application file for complete search history.

(56) References Cited

U.S. PATENT DOCUMENTS 3,973,849 A    8/1976  Jackson et al.
5,054,911 A   10/1991  Ohishi et al.
5,886,777 A    3/1999  Hirunuma 5,953,722 A *  9/1999  Lampert et al. ............... 707/100
6,062,190 A    4/2000  Sckowski et al.
6,791,477 B2 * 9/2004  Sari et al. .................. 340/995.19
6,819,267 B1 *11/2004  Edmark et al. ................ 340/988
6,895,329 B1 * 5/2005  Wolfson ........................ 701/209
7,028,191 B2 * 4/2006  Michener et al. ............. 713/182

OTHER PUBLICATIONS

PCT Search Report PCT/US 02/11288, Jun. 2, 2003.

* cited by examiner

*Primary Examiner* — Usmaan Saeed
*Assistant Examiner* — Paul Kim (57) ABSTRACT

A method and an apparatus for matching elements within sets of trajectories, locations or other attributes without revealing the entire sets. The elements are partitioned into segments. A rotating selection is made among the sets and one segment of each potentially matching element is newly disclosed from the selected set. Optionally, the sets are cryptographically hashed, using, for example, a MD5 hash or a SHA-1 hash. Optionally, the sets are represented as tries, and successively lower levels within the tries are newly disclosed from potentially matching elements as the disclosing set rotates. Optionally, the sets are encoded, using: a grid of longitude and latitude; a spatial temporal grid; a overlapping spatial grid; a temporal grid; a set of cities; a set of countries; a set of names of places; or a set of attributes. Optionally, the matching process is repeated while refining the encoding. Optionally, negotiations determine what encoding or cryptographic hash is used.

38 Claims, 7 Drawing Sheets

FINDING MATCHING LOCATIONS, TRAJECTORIES OR ATTRIBUTES WHILE MAINTAINING PRIVACY OF NON-MATCHING INFORMATION

BACKGROUND OF THE INVENTION

1. Field of the Invention

The invention relates to the field of information security and privacy and, more specifically, to finding matching entries in sets from two or more parties without revealing all of any party's entries.

2. Discussion of the Prior Art

Modern research and technology have provided society with a wide variety of electronic devices. Some of these modern electronic devices are very powerful and useful to those who use them. For example, the global positioning system (GPS) was initially deployed for United States military purposes, but today can be a useful aid for almost anyone.

For back country travelers, boaters on open waters, or others who navigate off the beaten path, carrying a light weight, battery powered GPS receiver can provide them with their position within several hundred feet. For motorists, a dramatic improvement in convenience and safety can be provided by carrying a GPS receiver integrated with a trouble alert system (perhaps using mobile telephone technology) or a road map database.

GPS receivers can be configured to record the time and position of the trajectories along which they travel. Such information can be maintained within such GPS receiver/recorder device. Periodically, it can be off-loaded onto a personal computer (PC), a personal digital assistant (PDA), or a server, for example.

Such trajectory information can be gathered and recorded with little or no intrusion on the person carrying the GPS receiver/recorder. Thus, a person could record their daily locations and travel over a period of days, years or even indefinitely.

Nevertheless, mining or making use of such information is difficult, both because of the volume of information potentially involved, and because of the privacy and security implications of sharing such information. Few individuals would be willing to make available to anyone else a complete log of where they have been over a period of time of significant duration. Even if certain "private" time periods could be easily deleted or not recorded, many people would consider a voluminous log of their whereabouts to be no business of anyone else.

Additionally, the security implications are daunting. Someone interested in burglarizing even an ordinary residence or place of business would be given a tremendous advantage by knowing the trends or patterns of who comes and goes from the place at what time—let alone if the person carrying the GPS receiver/recorder were a high profile person such as a leading politician or famous entertainer.

On the other hand, many people would be willing or even eager to reveal a limited subset of such trajectory information. For example, it often happens that two individuals who are meeting each other socially or for business have a feeling that they might have met before, but are unable to recall where and when that may have happened.

More generally, two or more individuals or organizations may possess information that can be represented as collections, data points or sets. They may desire to find what entities, elements or individual data points are present in all of the sets, but only if they can do so without revealing to the other participants all of the elements in their set. One example of such a problem includes several diplomats attempting to select where and when they will meet. Another example is two individuals determining if they both belong to any of the same golf courses, fraternal clubs or other organizations, which can be represented as the longitude and latitude of the clubhouse or headquarters.

Yet another example is two individuals selecting the time, date and place for initially meeting on a blind date. Another example is a company whose trucks are equipped with GPS receiver/recorder devices demonstrating that none of their trucks were near the coordinates of an accident. Yet another example is a person demonstrating that they have never gone near a location or region that is forbidden by the conditions of their parole or probation.

SUMMARY OF THE INVENTION

Accordingly, an embodiment of the invention provides a means and method for finding matching elements within a plurality of sets without revealing the entire sets. Each element of two or more sets is partitioned into a series of segments. A matching process is repeated, in which one of the segments from each element is disclosed for those elements that are potential matches within a selected one of the sets, the elements that do not match the newly disclosed segments are removed as potential matches, and which of the sets is selected is rotated.

In some embodiments of the invention, the elements of the sets are encoded. The encoding may include, for example: a grid of longitude and latitude; a grid of longitude and latitude with overlapping cells; a spatial temporal grid; a spatial grid; a temporal grid; a set of cities; a set of countries; a set of names of places; or a set of attributes. In other embodiments of the invention, the particular encoding to be used is negotiated. In yet other embodiments of the invention, the encoding and matching process is repeated a number of times while refining the encoding.

In some embodiments of the invention, a cryptographic hash is applied to the sets. The cryptographic hash may include, for example: an MD2 hash; an MD4 hash; an MD5 hash; a hash according to a version of an ISO/IEC 10118 standard; or a hash according to a version of a FIPS 180 standard. In other embodiments, the particular cryptographic hash used is negotiated.

In some embodiments of the invention, the plurality of sets that are partitioned and matched are selected by finding those sets that have corresponding positions within ordered sequences of sets. In other embodiments, each set represents the location of a particular object at a particular time and the sets form a temporal sequence for each object. The invention is then applied to the sets having corresponding times. In yet other embodiments, the sets represent locations to which a particular object is near.

In other embodiments of the invention, which of the segments is to be disclosed next is specified in a challenge and response manner.

Some embodiments of the invention represent each set using a particular type of tree, which is known as a "trie." In other embodiments, the arcs of the trie represent the segments of the elements.

The invention may be embodied, for example, as: a system; a hardware module; a software module; a method; a media that provides instructions for a programmable device; or a combination thereof.

DESCRIPTION OF THE DRAWING

The drawing illustrates technologies related to the invention, shows example embodiments of the invention, and gives examples of using the invention. The objects, features and advantages of the invention will become more apparent to those skilled in the art from the following detailed description, when read in conjunction with the accompanying drawing, wherein:

FIG. 1 contains two message flow diagrams, each showing an example dialog between two devices, each device having data on one person's whereabouts over the last two years, in attempts to determine if and when they might have met, where

FIG. 4 shows how, according to various embodiments of the invention, a position of an object may be represented as a set of grid cells, where

DETAILED DESCRIPTION OF THE PREFERRED EMBODIMENTS

The descriptions and discussions herein illustrate technologies related to the invention, show examples of the invention and give examples of using the invention. Known methods, procedures, systems, circuits or components may be discussed without giving details, so as to avoid obscuring the principles of the invention. On the other hand, numerous details of specific examples of the invention may be described, even though such details may not apply to other embodiments of the invention. Details are selectively included and omitted so as to better explain the invention and so as to aid in understanding the invention.

The invention is not to be understood as being limited to or defined by what is discussed herein, and the invention may be practiced without the specific details described herein. One skilled in the art will realize that numerous modifications, variations, and selections among alternatives, changes in form, and improvements can be made without departing from the principles or legal scope of the invention.

Some descriptions herein use abstract or general terms including, but not limited to, symbol, number, bit, procedure, step, and block. Those skilled in the art use such terms as a convenient nomenclature for data and operations within a computer, digital device or electromechanical system. Such data and operations are represented by physical properties of actual objects including, but not limited to, electronic voltage, magnetic field and optical reflectivity. Similarly, perceptive or mental terms including, but not limited to, detect, sense, recall, present, compare, process, manipulate, analyze, and determine may also refer to such data and operations or to manipulations of such physical properties.

Figure 1A:
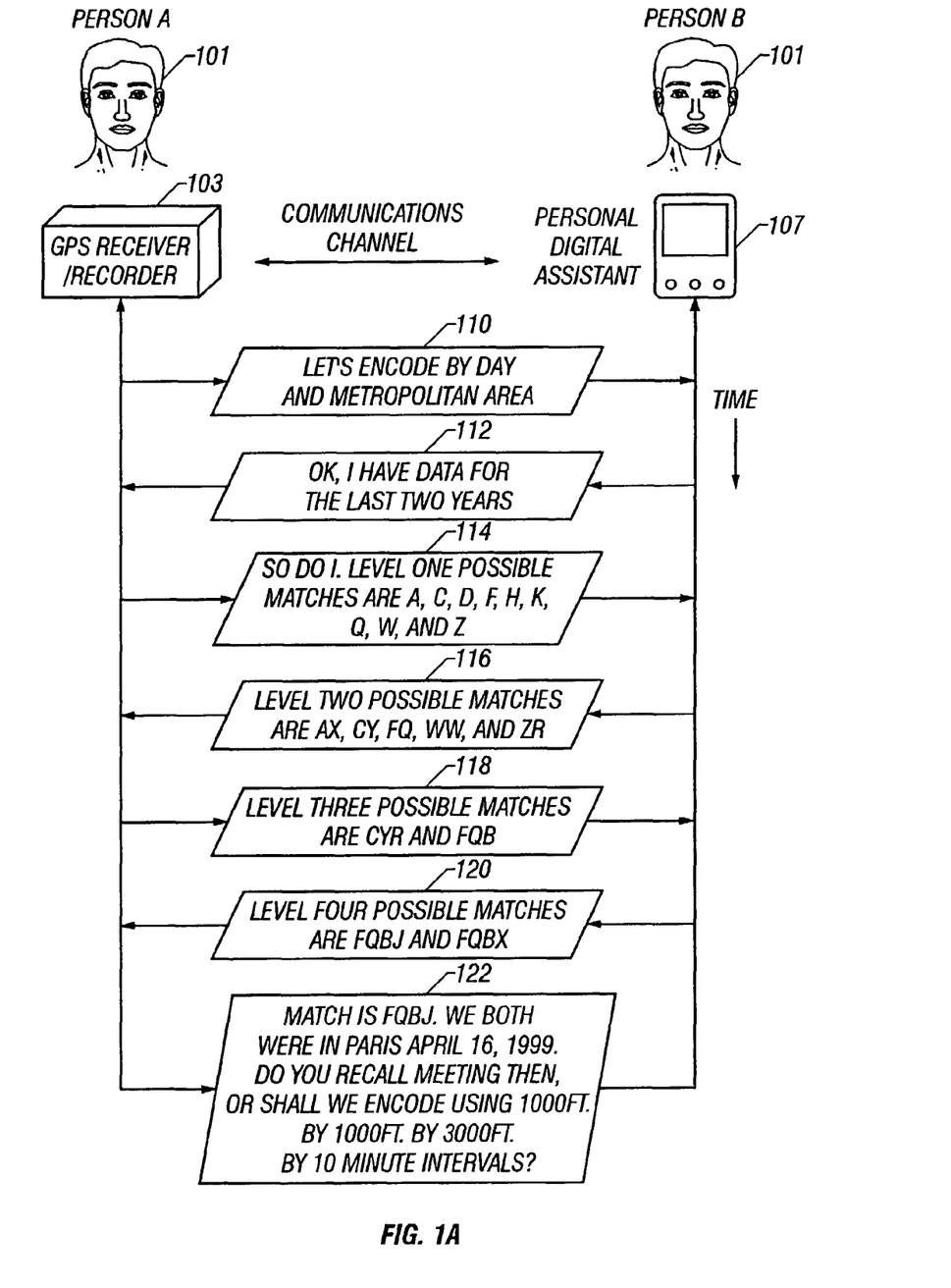
FIG. 1A is a flow diagram according to an embodiment of the invention showing use of a multi-level data structure known as a "trie.

FIG. 1A is a data flow diagram, according to some embodiments of the invention, showing two devices, each having data on one person's whereabouts over the last two years. The example dialog of this figure attempts to determine if and when two people 101 might have met. The embodiment shown in FIG. 1A uses a trie to represent the set of encoded spatial temporal locations, as is discussed with respect to FIG. 3 below. Each element in FIG. 1A represents one spatial temporal location as a four letter text string.

Person A has been using global positioning system (GPS) receiver/recorder 103 to gather and retain information on where he has been. Person B has similar information on personal digital assistant (PDA) 107, perhaps gathered by and transmitted from another GPS receiver/recorder 103, perhaps gathered from calendar or scheduling software, or perhaps entered via Person B's diary or log.

Initially, message 110 is sent via communications channel 105 from GPS receiver/recorder 103 to PDA 107. Communications channel 105 may employ infrared or other appropriate means to transmit information. Message 110 includes a proposal for how to encode the spatial temporal coordinates of people 101, specifically to encode by day and by metropolitan area. In some embodiments of the invention, metropolitan areas may be encoded using some subset or variation of the international three letter airport codes, for example, "SFO," "SJC" or "OAK" for the San Francisco Bay Area in Calif., and "PAR," "CGD," "JDP" or "ORY" for the Paris area in France.

Message 112 accepts this proposal for encoding and proposes a range of time to be used in the matching process, specifically the last two years. Message 114 accepts the proposed range of time.

In some embodiments of the invention, the negotiation process of messages 110 and 112 are handled automatically based on preferences and security settings established by the users of GPS receiver/recorder 103 and of PDA 107. In other embodiments, people 101 are involved in this negotiating process or at least approve its conclusion before any data is transferred.

There is a general tradeoff between generality of the grid or encoding categories used, desired performance, and privacy. The larger or more abstract the grid or categories used, then the quicker it is to find any matching entries. However, the larger or more abstract the grid or categories used, the easier it is for someone to guess or extract information about people 101 that is not a genuine match of set elements. Thus, it would have better protected privacy in the example shown in FIG. 1 to have initially used a grid measured in feet, rather than a grid defined by metropolitan areas.

There is another general tradeoff between the duration of the period for which matching coordinates are sought, and performance. The longer the period of time considered in the matching process, the more time or computing resources the matching process will consume.

The tradeoff, if any, between duration and privacy depends on the details of the situation. On the one hand, more data points in the range considered for matching may make it more obvious if a party attempts to generate deceptive aliases. On the other hand, more data points matched may reveal more patterns, habits and other information about a person.

In message 114, GPS receiver/recorder 103 discloses to PDA 107 that the first set of possible matches is "A," "C," "D," "F," "H," "K," "Q," "W" and "Z". These are the level one possible matches. Within the trie of GPS receiver/recorder 103 the possible matches are each node that is at the first level lower than the root. In the embodiment of the invention shown in FIG. 1A, there is no significance to the order in which the nodes are disclosed, but they are alphabetized for convenience.

In the example embodiment of the invention shown in FIG. 1, characters of the English alphabet represent the possible arcs within the tries. The arcs in the tries represent a portion or segment of the values of the sets.

In response, in message 116, PDA 107 discloses to GPS receiver/recorder 103, that the second set of possible matches is "AX," "CY," "FQ," "WW" and "ZR." Note that each of these possible matches starts with one of the characters in the first set of possible matches. This is because any trie element that PDA 107 has that does not so start is not a possible match to a trie element within GPS receiver/recorder 103.

Not every element from the first set of possible matches has a descendant in the second set of possible matches. The ones that are dropped represent ranges of time and space coordinates where Person A has been, but Person B has not been.

In response, in message 118, the GPS receiver/recorder discloses to PDA 107 that the level three possible matches are "CYR" and "FQB." Again, each possible match starts with a possible match from the preceding level. And again, each possible match from the preceding level may have zero, one or more descendent possible matches at the next level.

The next response 120 (level four) from PDA 107 is that there are two possible matches, "FQBJ" and "FQBX."

Finally, in the response in message 122, the GPS receiver/recorder discloses to the PDA that the only match according to this encoding is "FQBJ," which, in the example of FIG. 1, is the hash value for the metropolitan area of Paris, France, for the day Apr. 16, 1999.

There is the possibility of a limited amount of deception at the last level of the disclosure process. If "FQBJ" is a match, but PDA 107 signals to the GPS receiver/recorder that there is no match, then PDA 107 knows what the matching element is (or what the matching elements are) but has hidden this information from GPS receiver/recorder 103. Similarly, if "FQBX" is not a match, the GPS receiver/recorder has access to the value corresponding one non-matching element of PDA 107.

One solution to potential attacks on privacy may be to apply a cryptographic hash to each element of each set prior to partitioning or dividing the elements into segments and representing them in a trie. If an appropriate cryptographic hash is used on the elements and the segments are small, then the likelihood that a potential match will first fail on the last segment is small.

Another solution to such a potential privacy attack may be to arrange which device starts first and how many levels there in the tries such that the final confirmation is done by the party with the least motivation to deceive or to crack the hash function to determine a non-matching element.

Another solution to potential privacy attacks is to repeat the incremental or stepwise disclosure process a second time, with the parties changing the order in which they disclose. For example, for the two party case, the parties would swap who discloses first. The messages of the second round would not be identical to those of the first, but each device can compare results at each level and detect inconsistencies. Alternatively or additionally, the rounds of incremental disclosure and matching can be repeated, varying both the disclosure order and the hash function. It will be clear to one skilled in the art that embodiments of the invention designed for more than two parties can address this issue by repeating the disclosure process a number of times, with the particular hash function used changed, the disclosure order among the parties changed, or both.

A second possible attack on privacy is for one of the devices to pretend that a partially disclosed element that matches so far does not match, and then assume that the corresponding element on the other device fully matches that element. The certainty of that assumption may depend on the details of the encoding, the hashing and the partitioning into segments that are used, as well as on the order in which the segments are revealed. Possible defenses against such attacks may include raising a red security flag when a partial match is discarded at a point sufficiently late in the incremental disclosure and matching process that the full value of the element may be surmised. In some embodiments of the invention, such a flag or a statistical measure of how often such a flag occurs could trigger breaking off the incremental disclosure dialog or at least asking the user if the process should continue. Alternatively, the flag could suggest that the other device in fact has an element that corresponds to the partial match, and abort the process, when something apparently out of line is detected. Other possible defenses to privacy attacks include choosing the details of the process, for example, the encodings, the hashing, the partitioning into segments and the order in which the segments are revealed such that elements are likely to have different values for the segments that are revealed late in the matching process.

A third possible attack on privacy is for one of the devices to pretend to be in many places at once, hoping that one of its false aliases will match where the other party was. Defenses include using coordinate systems or universes of possible attribute values that contain a very large number of possible values. If a device that is trying to guess where the other person has been must make a large number of guesses, then there will be a large disparity between the average number of possible matches that an honest participant will disclose at the various levels and the average number of possible matches that a deceptive participant will disclose. Again, some embodiments of the invention may track such statistical measures and abort the process, or at least ask the user if the process should continue, when something apparently out of line is detected.

After message 122, the work of some embodiments of the invention may be done. It may be that the date and city information contained in message 122 is sufficient to jog the memory of at least one of people 101 as to where and how they met, for example, at a business meeting or professional conference being held at those coordinates. Alternatively, it may be that this date and city information is sufficient to allow at least one of people 101 to eliminate the possibility that they met. For example, Person A may recall that he did not arrive in Paris until the afternoon of that day and spent the remainder of the day only with his family.

Alternatively after message 122, it may be that the encoding used can be made more specific or otherwise refined, after which the process of this embodiment of the invention can be beneficially repeated. For example, message 122 includes a proposal for another round of the incremental disclosure and matching process that would use a much finer spatial temporal grid. Specifically, it proposed a longitude and latitude resolution of 1000 feet by 1000 feet, an elevation resolution of 3000 feet, and a time resolution of 10 minutes. The results of such a refined matching process might allow persons 101 to either definitively say that their paths did not cross, or that they were both at or near a specific location at the same time. Of course, this attempt to find matching coordinate data points need only consider coordinates of each party that are in the Paris area on Apr. 16, 1999.

Figure 1B:
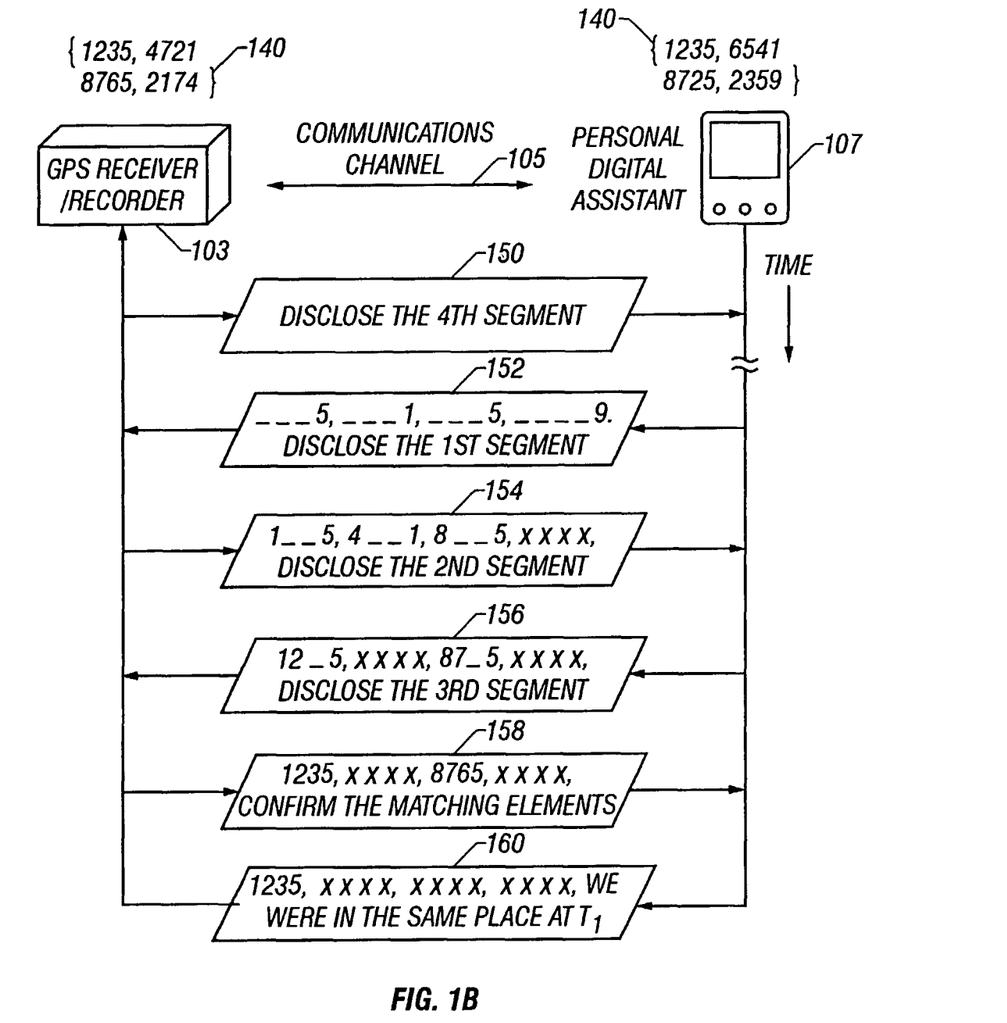
" and FIG. 1B is a flow diagram according to an embodiment of the invention showing exchanges of information in a challenge and response manner.

FIG. 1B is a data flow diagram again showing the messages passed between two devices, according to other embodiments of the invention. The devices of FIG. 1B do not use a trie. Rather, they use a challenge and response method of selecting which segment is to be disclosed next.

The only matches of interest in the example shown in FIG. 1B are ones in which the $N^{th}$ element of each set match. This corresponds with, for example, the case where each set is a series of locations of an object according to a temporal grid or unit of time, that is, where the $N^{th}$ element of the set represents the location of the object at time $T_n$.

Other examples of ordered series of sets to which various embodiments of the invention can be applied include but are not limited to: a spatially ordered series of sets; a spatially ordered series of sets in which each element represents a time at which a given object is at the location represented by a particular set within the series; or a spatially ordered series of sets in which each element represents both an object and a time at which that object is at the location represented by a particular set within the series.

The non-trie, challenge and response method of FIG. 1B can also be applied to situations in which there is no temporal or other correspondence between the elements of the sets to be matched.

A numeral is used in FIG. 1B to represent each segment of the elements of sets 140, four such sets being shown above GPS 103 and PDA 107, an underscore is used to represent a not yet disclosed segment of an element that is a potential match, and "XXXX" is used to represent an element that is known to be non-matching.

Initially, message 150 is sent via communications channel 105 from GPS receiver/recorder 103 to PDA 107. Message 150 includes a challenge for the other device to disclose the $4^{th}$ segment. The communications channel may employ infrared or other appropriate means to transmit information.

In response, PDA 107 discloses the current potential matches as "_ _ _ 5," "_ _ _ 1," "_ _ _ 5" and "_ _ _ 9" because initially each element is a potential match. Message 152 contains this response along with a new challenge that GPS receiver/recorder 103 disclose the values of the $1^{st}$ segment for each potential match.

In response, GPS receiver/recorder 103 discloses in message 154 that the current set of potential matches is "1 _ _ 5," "4 _ _ 1," "8 _ _ 5" and "XXXX." Prior to sending this message, GPS receiver/recorder 103 removed the $4^{th}$ element from the potential matches because the "_ _ _ 9" disclosed as the $4^{th}$ element in message 152 does not match its $4^{th}$ element, which is "2 1 7 4." Message 154 also contains a challenge to GPS receiver/recorder 103 to disclose the $2^{nd}$ segment.

In response, PDA 107 discloses in message 156 the current potential matches as "1 2 _ 5," "XXXX," 8 7 _ 5" and "XXXX." Prior to sending this message, PDA 107 removed the $2^{nd}$ element from the potential matches because the "4 _ _ 1" disclosed in message 154 does not match its $2^{nd}$ element, which is "6 5 4 1." Message 154 also contains a challenge to PDA 107 to disclose the $3^{rd}$ segment.

In response, GPS receiver/recorder 103 discloses in message 158 the current potential matches as "1 2 3 5," "XXXX," 8 7 6 5" and "XXXX." In message 160, the PDA confirms that the only match is "1 2 3 5" at time $T_1$.

The challenge and response method illustrated in FIG. 1B may have security advantages in some situations over the trie method illustrated in FIG. 1A. This is because each device gets to select which segment is next disclosed by the other. Methods of making such a selection include, for example, randomly, or by picking the segment that is most evenly distributed in value among the current set of potential matches, or by picking the element that is least evenly distributed in value among the current set of potential matches. The latter method may be advantageous in ensuring that the incremental disclosures that occur late in the process do exclude potential matches so as to help prevent potential privacy attacks as described above.

Figure 2:
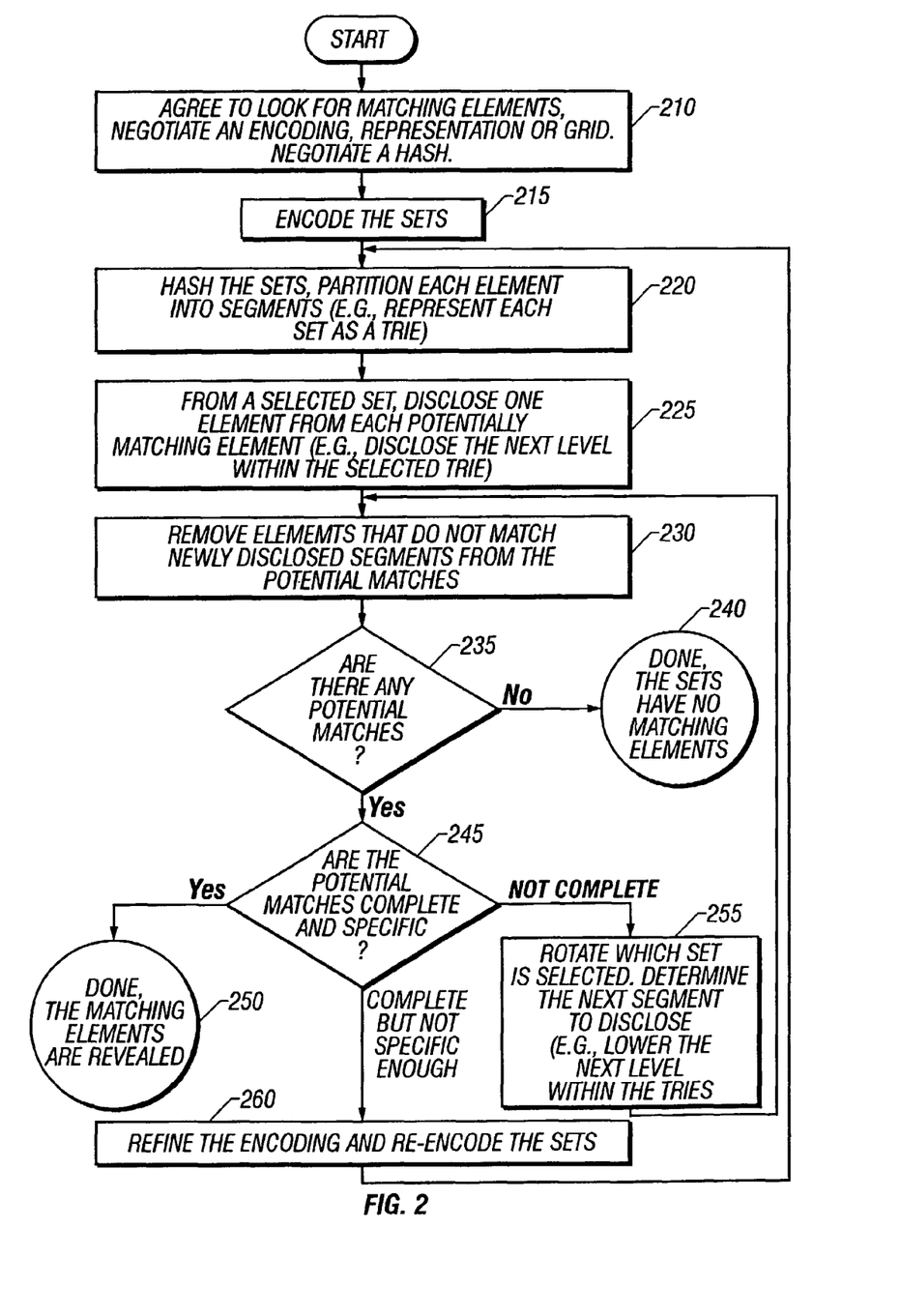
FIG. 2 is a flow chart of the steps involved, according to some embodiments of the invention, in finding matching elements within a plurality of initial sets without revealing the entire sets.

FIG. 2 is a flow chart, according to some embodiments of the invention, of finding matching elements within a plurality of initial sets without revealing the entire sets. The process starts with step 210, in which an agreement is reached between two or more parties to look for matching elements within each party's set. This agreement may be explicitly reached by the people whose data is to be matched, reached automatically by the computers or other devices on which each party's data resides, or reached by some hybrid combination of explicit and automatic. This agreement may be reached by a process of negotiation, in which each device/party proposes an alternative or range of alternatives and the other device/party accepts a particular proposal, rejects it or counter proposes an alternative.

If the sets include temporal information or spatial temporal information, then the range of time to be considered should be negotiated in step 210 if not otherwise specified or agreed upon. For example, it makes no sense for one party to process and partially reveal spatial temporal coordinates for the last two years if the other party only has them available for the last six months.

In some embodiments of the invention, the agreement reached in step 210 includes negotiating the encoding, representation or grid to be used for the sets during the matching process. Suitable encodings may include, for example: a grid of longitude and latitude; a grid of longitude and latitude with overlapping cells; a spatial temporal grid; a spatial grid; a temporal grid; a set of cities; a set of countries; a set of names of places; or a set of attributes. If spatial or temporal encoding is used, both the resolution or the size of the grid cells and the zero value or offset must be negotiated or otherwise made consistent.

In other embodiments of the invention, step 210 includes negotiating a cryptographic hash function that is applied to the elements, as discussed below with regard to step 220.

In yet other embodiments of the invention, step 210 includes negotiating how the elements will be partitioned into segments, the order in which the segments will be disclosed, or how it will be determined in what order the segments will be disclosed.

Next, in step 215, the device of each party may encodes their private initial data sets according to the particular encoding agreed upon. This step is optional, and may be omitted for example in embodiments of the invention where the initial representation of the private sets uses the encodings agreed upon.

Then in step 220, the device representing each party may hash the encoded sets using a cryptographic hash. This hashing process is optional, and may be omitted, for example, in embodiments of the invention where the sets are represented or encoded in a manner that protects sufficiently against recognizing or deducing the complete value of an element based on partial disclosure of some of the segments of the elements.

A number of cryptographic hash functions have been studied, implemented and even standardized. Examples include, but are not limited to:

MD2 and MD4, which are described in U.S. Pat. No. 4,908,861;

MD5, which is described in the Internet Engineering Task Force (ITEF) Request for Comments (RFC) Number 1321 and which may be available via "www.ietf.org";

Standard ISO/IEC 10118 as specified by the International Organization for Standardization, which may be available via "www.iso.ch"; and Standard Secure Hash Algorithm-1 (SHA-1) as specified by the Federal Information Processing Standards (FIPS) in PUB 180-1, which may be available via "www.itl.nist.gov/fipspubs/index.htm".

Criteria for selecting a cryptographic hash suitable for use with the invention include, but are not limited to, the following:

The hash function should be relatively easy to compute one way (that is, from the value of an element to the hashed value of that element).

It should be relatively computationally intensive or effectively not computable to go the other way (that is, from the hashed value of an element to the value of that element prior to hashing).

The hash function should be relatively collision free such that it is unlikely that there is more than one meaningful value for an element that corresponds to a particular hash value.

The hash function should produce hash values of a fixed bit length (for example, 128 or 160 bits in some embodiments of the invention).

Step 220 also includes a process of partitioning each element of the sets into a series of segments. This process may, for example, be as simple as dividing an element represented as a single 128-bit word into 32 four-bit nibble segments, or the segments may be unequal in size, or they may be computed from the values of the elements.

In some embodiments of the invention, the partitioning process of step 220 includes using a trie data structure to represent the sets. A trie is generally considered to be a tree in which there is one node for every common prefix of the values represented in the trie. Tries and their associated arcs are discussed below in reference to FIG. 3.

Next, in step 225, the plurality of devices communicate with each other to incrementally reveal potentially matching elements. Specifically, one device is selected to disclose one segment from the current potential matches among the elements of the set or trie corresponding to that device.

In embodiments of the invention that use tries, when step 225 first occurs the initial potential matches are the entire first level within the trie of the selected device. The second time step 225 occurs, a different device or trie is selected and that device discloses the currently active set of potential matches at level two—that is, every node in its trie that is a descendent of any previously disclosed level-one nodes for which it has a matching level-one node.

In embodiments of the invention that do not use tries, when step 225 first occurs the initial potential matches are the entire set and the selected device discloses one segment of every element of the selected set. The second time step 225 occurs, a different selected device discloses a second segment from those elements of the selected set that have segments that match the segments disclosed during the previous occurrence of step 225.

In step 230, each device that is not the selected device removes from its set of potential matches every element that does not match the segment or trie arc that is newly disclosed in step 225.

The iteration of this incremental disclosure process is controlled by steps 235 and 245. If no potential matches are disclosed by the selected device in any iteration of step 230, then the process of the invention stops in step 240, which indicates that the sets contain no matching elements.

If the potential matches disclosed in step 230 are complete, then the process of the invention may stop in step 250, which indicates that the matching elements among the sets are now revealed to all participating parties or devices. Some embodiments of the invention distinguish between the situation in which the encoding used has sufficiently identified the matching elements from the situation in which matching elements are found but are not sufficiently specific to be useful. This may be a decision that involves the users of the devices. If the matching elements are sufficiently specific, then the process stops in step 250.

Alternatively if more specific information is desired, then control passes to step 260. In step 260, each participating device re-encodes its initial set according to a more refined or detailed encoding, which may include grid dimensions of smaller resolution, for example. Then control passes to step 220, in which the re-encoded sets are partitioned, after optionally being hashed. Then another round of the iterative incremental disclosure and matching process occurs.

If the potential matches disclosed in step 230 do not completely reveal matching set elements, then control passes to step 255, which sets up the next iteration of disclosure and matching. In step 255, the selected set, trie or device is rotated between or among those participating.

In embodiments of the invention that use tries, the next or active level within the tries is lowered. In other embodiments, which of the segments is to be disclosed next is selected. In various embodiments of the invention, segment selection may occur according to the challenge and response method described above in reference to FIG. 1B, or it may be specified algorithmically (for example, simply disclosing the segments in a predetermined order). Other embodiments allow the device that is doing the disclosing to choose which segment it discloses. After setting step 255, control loops back to step 225 for the next incremental disclosure.

In some embodiments of the invention, steps 235 and 260 are revised to generalize, rather than make more specific, the encoding used when no matching elements are found. For example, two business executives may be trying to signal their willingness to meet in the San Francisco Bay Area the week of August $4^{th}$ to August $8^{th}$, but one enters the coordinates of downtown San Francisco on the $4^{th}$ and the other enters the coordinates of their company's San Jose office on August $8^{th}$. After no matches are found on a grid of 1000 feet and a day, trying again using a grid of metropolitan area and week may find a match.

It will be clear to one skilled in the art that numerous variations in form and detail can be made to the process flow of FIG. 2 without departing from the intent and scope of the invention including, for example, reordering the steps, replacing a step or a sequence of steps with an equivalent, or altering the data representations, encodings, and structures. Further, the initializations, ending conditions and iteration control are likely to vary among various embodiments of the invention.

Figure 3:
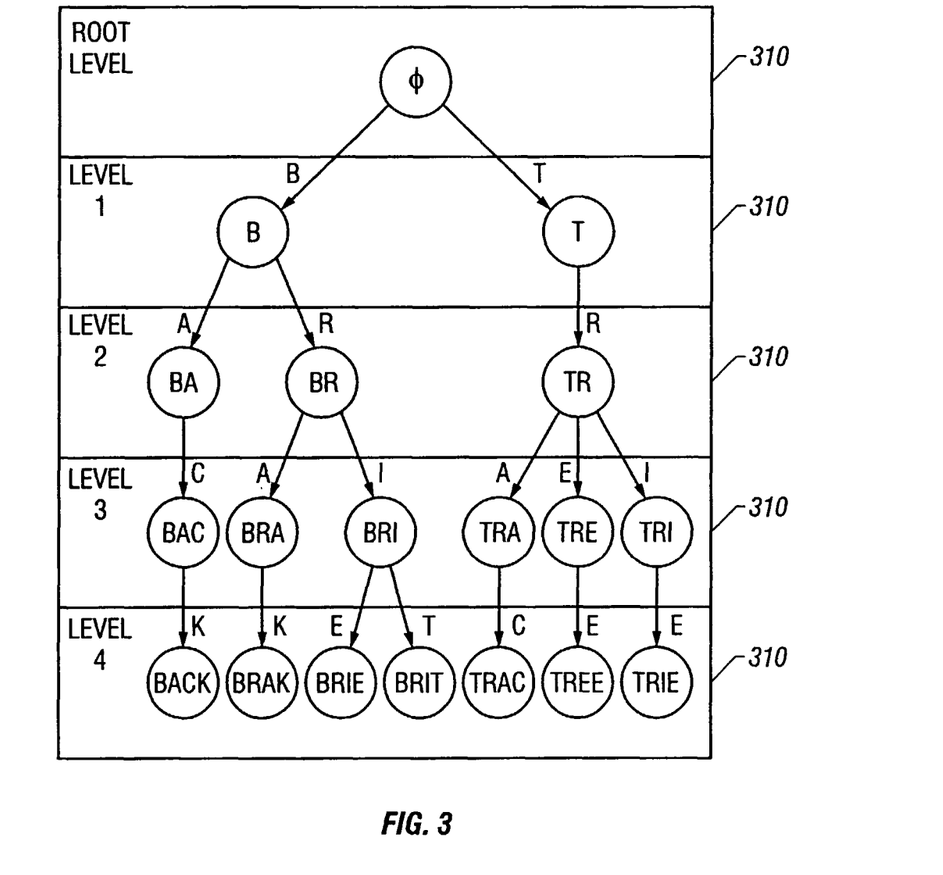
FIG. 3 shows how, according to some embodiments of the invention, data that encodes time and space coordinates (or other attributes) may be represented using a trie.

FIG. 3 shows how, according to some embodiments of the invention, the hashed representation of the sets, or any representation of the sets having a fixed length among the elements, can be represented as a trie. For clarity in FIG. 3, the letters of the English alphabet are used as the series of segments, that is, the arcs from a predecessor node to a successor node in the trie. Various embodiments of the invention may, for example, use arcs that represent the following: a bit; two bits; a four-bit nibble; an eight-bit byte; a sixteen-bit half word; or a thirty-two-bit word.

All tries have a single node at their root level 310. Each level-one node of a trie (or alternatively, each arc from the root node to each level-one node) represents a single segment or character, which is the prefix of the values of every successor node.

As shown in FIG. 3, there are only two nodes at level one, which represent "B" and "T." Thus all nodes in this example trie have values starting with one of those two letters. There are three nodes at level two. Two of these values represent the values "BA" and "BR," which are successor nodes to the level-one node "B." The third level-two node represents the value "TR." There are six level-three nodes, one of which descends from the node "BA," two of which descend from the node "BR," and three of which descend from the node "TR." There are seven level-four nodes, which represent the values "BACK," "BRAK," "BRIE," "BRIT," "TRAC," "TREE" and "TRIE."

The levels of the trie data structure support the stepwise or incremental disclosure and matching process used in some embodiments of the invention. If the trie of the first device to disclose is represented by FIG. 3, then it will disclose "B" and "T" as the current set of possible matches. Assume that there is only one other device participating in the matching process. Also, assume that "BR" is the only node at level two in the other device with a value that starts with "B" or "T." Thus, "BR" is the next set of possible matches disclosed by the other device. Next, the device represented by FIG. 3 discloses "BRA" and "BRI" as the next set of possible matches. Assume that the other device then discloses "BRAZ" and "BRIE" as the next set of possible matches. The device represented by FIG. 3 then discloses "BRIE" as the only actual complete match.

The other device has disclosed that the person it represents was in a time and space coordinate whose value hashes to "BRAZ." Nevertheless, in embodiments of the invention that apply a one way hash function to the set elements prior to the matching process, such information may reveal little about the un-hashed value of that element. Given a reasonably large range of possible coordinates or other values for the elements and a reasonably good choice of cryptographic hash function, it may be computationally infeasible to compute what element value hashes to the value "BRAZ."

Figure 4A:
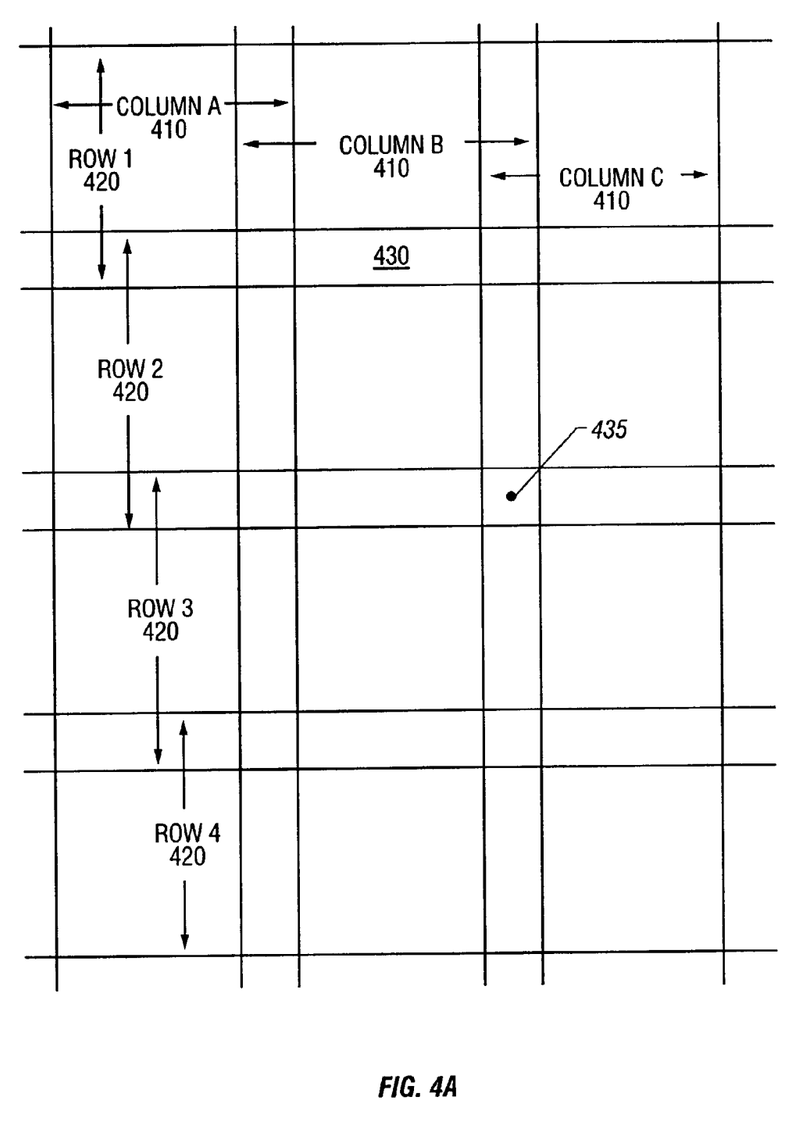
FIG. 4A shows the use of overlapping grid cells to describe or encode a position.

FIG. 4A shows how, according to some embodiments of the invention, overlapping grids can be used to encode the initial sets. Civilian use of the GPS system has a deliberately built-in error on the order of 100 meters. In addition to that, noise, weather conditions, multi-path reflections and human errors can cause significant errors. Thus, matches for spatial coordinate data are encoded, in some embodiments of the invention, according to the overlapping rows 420 and overlapping columns 410 shown in FIG. 4A. For example, coordinates within region 430 are encoded as both cell B1 and cell B2, and those within region 435 are encoded as each of cells B2, C2, B3 and C3.

In addition to dealing with the accuracy limitations discussed above, the various approaches of FIG. 4 can enable the users of the invention to specify a proximity range. That is, the users can ask, for example, to know when and where the objects were near each other or within a particular distance of each other.

Figure 4B:
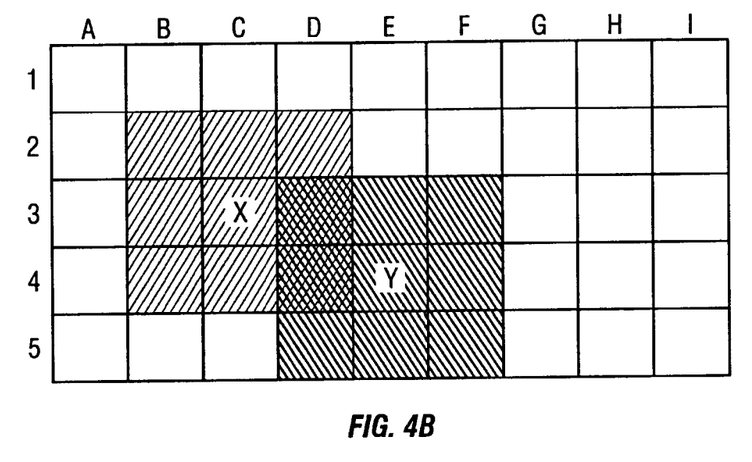
FIGS. 4B and 4C show the use of adjacent rectangular grid cells, and FIG. 4D uses adjacent hexagonal grid cells.

FIG. 4B shows how, according to other embodiments of the invention, each initial position is encoded as eight adjacent cells within a non-overlapping rectangular grid. Specifically in FIG. 4B, the location of object "X" at the time illustrated is the cell containing X and every directly adjacent cell, that is, the set {B2, C2, D2, B3, D3, B4, C4 and D4} as shown by the first cross hatch pattern. The location of object "Y" at the time shown is the set {D3, E3, F3, D4, E4, F4, D5, E5 and F5} as shown by the second cross hatch pattern. The matching elements between the two sets of FIG. 4B are D3 and D4. Because there are elements that match exactly, we know that objects "X" and "Y" were in proximity to each other at the time illustrated.

Some embodiments of the invention over-sample the grid; that is, if the distance specified by the users as a match is, for example, "within 100 feet," then the cell size is set smaller, for example, 50 or 25 feet. Such over-sampling makes it less likely that objects that are a little more than the specified distance apart are found to be matches.

Figure 4C:
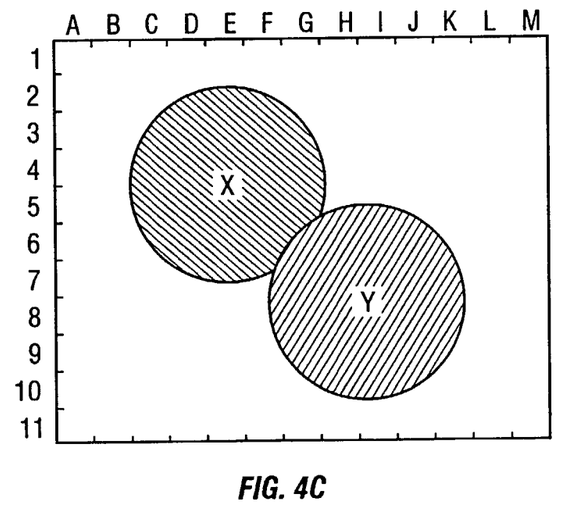

FIG. 4C shows, according to yet other embodiments of the invention, how each initial position can be encoded as a variable number of adjacent cells within a non-overlapping rectangular grid. Specifically, the location of an object at the time illustrated is the set of cells where any portion of the cell is within a particular distance from the object. For object "X," the particular distance is shown as the circle centered at "X" and the cells are shown by the first cross hatch. For object "Y," the particular distance is shown as the circle centered at "Y" and the corresponding cells are shown as the second cross hatch. The matching elements are the cells F7, G6 and H5. In some embodiments, the particular distances used to select cells may be half the distance specified by the users as a match.

Figure 4D:
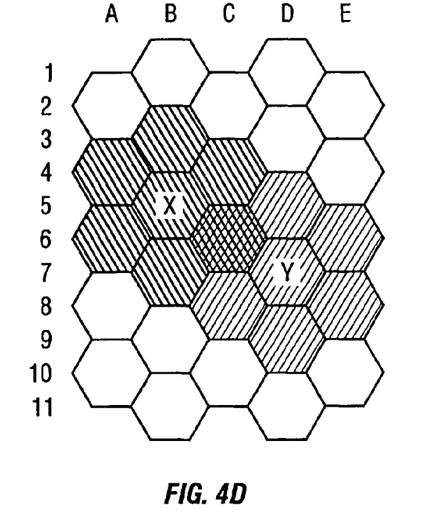

FIG. 4D shows, according to other embodiments of the invention, how each initial position is encoded as seven adjacent cells within a non-overlapping hexagonal grid. Specifically, the location of object "X" at the time illustrated is cell containing X and every directly adjacent cell. This is the set {A4, A6, B3, B5, B7, C4 and C6} and is shown by the first cross hatch pattern in FIG. 4D. The location of object "Y" at the time shown is the set {C6, C8, D5, D7, D9, E6 and E8} and is shown by the second cross hatch pattern. For the example shown in FIG. 4D, the matching element is the cell C6.

The approaches illustrated in FIG. 4 are examples of approaches in which the location of an object is represented by more than one cell in a grid, that is each location is represented by a set of cells. Such approaches can be used to model measurement uncertainty, proximity ranges or both. Applying such techniques to the trajectory of an object as it moves over time leads to the trajectory being represented as a temporal sequence of sets of spatial cells. Some embodiments of the invention look for matching elements within those sets that represent different objects at the same point in time, or at a corresponding point in time. Other embodiments look for matching elements within those sets that represent when different objects were near each other, i.e. within the proximity range of each other that was used in establishing the sets.

Returning to the example of FIG. 1B, the exchange of messages as shown assumes that each person was in exactly one spatial grid cell at each point in time. However, in general there can be one or more spatial cells that represent the location of each person during each interval of time. Also, there can be time intervals having no corresponding spatial cells, for reasons that include, for example: the locating device being shut off or malfunctioning; accidental loss of data; or deliberately deleting or not recording location information during particular private time intervals.

Figure 5:
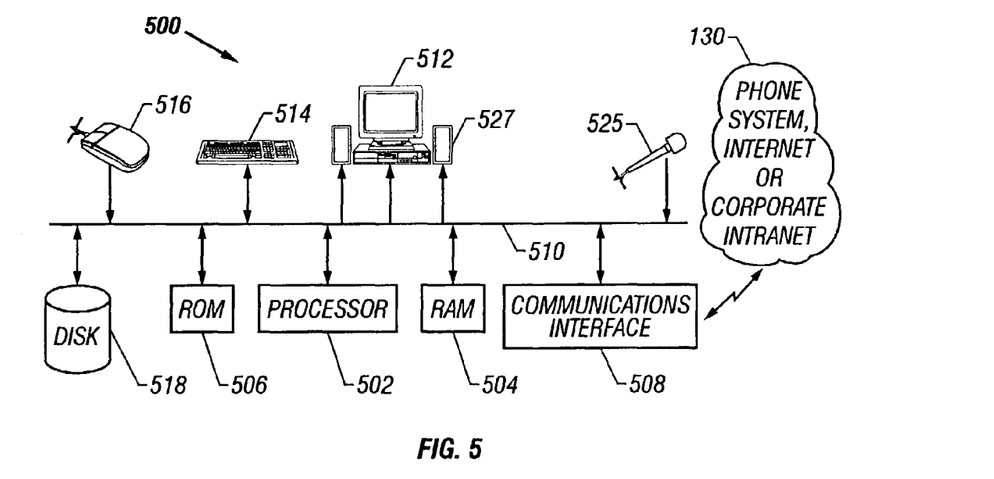
FIG. 5 is a block diagram of the functional components and their interconnections of a computer system that may be used in accordance with some embodiments of the invention.

FIG. 5 is a block diagram of an example computer system that can be used in some embodiments of the invention. Computer system 500 is not limited to being a typical personal computer but it may be any type of computing device, including, for example, a server, portable computing device, or a personal digital assistant. Computer system 500 and variants thereon may be employed in the invention as global positioning system (GPS) receiver/recorder 103, personal digital assistant 107, or personal computers, servers and the like that hold the initial sets and implement the matching process of the present invention.

Computer system 500 comprises one or more buses 510 configured to communicate information including addresses, operational codes, and data. The computer system also comprises one or more processors 502 configured to process information and data according to instructions and other data. The processor may be a central processing unit, a microprocessor, an embedded processor, or a special purpose processor, for example.

The computer system may optionally include RAM 504, that is, one or more volatile memory units or other devices or circuits configured to store information, data and instructions. RAM 504 may be random access memory (RAM), static RAM, or dynamic RAM, as examples. RAM 504 is coupled to bus 510.

Computer system 500 may optionally include ROM 506, that is, one or more non-volatile memory units or other devices or circuits configured to store static information and instructions. ROM 506 may include, but is not limited to, read only memory (ROM), programmable ROM, flash memory, electrically programmable ROM (EPROM), or erasable electrically programmable ROM (EEPROM). ROM 506 is coupled with bus 510.

The computer system may optionally include communications interface 508, that is, one or more devices or circuits configured to interface with another electronic device, represented by phone system internet or corporate intranet 130. Communications interface 508 is coupled to bus 510 and may be based on wired communication technology, wireless communication technology, or both. The communications interface may be a serial communication port, a Universal Serial Bus (USB), an Ethernet adapter, an IEEE 1394 bus interface, a parallel port, a small computer system interface (SCSI) bus interface, an infrared (IR) communication port, a Bluetooth wireless communication adapter, a broadband connection, or a connection to the Internet, among others.

Computer system 500 may optionally include keyboard 514, that is, one or more alphanumeric input devices configured to communicate information and command selections from a user. Keyboard 514 may, for example, have alphabetic, numeric, function and control keys, buttons, selectors or touch-sensitive screens. The keyboard is coupled to bus 510.

The computer system may also include mouse 516, that is, one or more cursor control, indicating, selecting or pointing devices configured to communicate analog, quantitative or selection user input information and command selections to processor 502. The mouse element may be a mouse, a track ball, a track pad, an optical tracking device, a joystick, a game controller, a touch screen, or a glove, for example. The mouse is coupled to bus 510. Alternatively or additionally, the functions of mouse 516 may be directed or activated via input from keyboard 514 using special keys, key sequences or commands.

Computer system 500 may optionally include one or more devices configured to sense, process, generate and recognize voice commands, responses or other words. Voice recognition may replace or augment the functions of keyboard 514, mouse 516, or both. Such devices may include, but are not limited to, microphone 525 or speaker 527, which may also be used for audio capture and reproduction of, for example, speech, singing and music.

The computer system may optionally include disk 518, that is, one or more devices or circuits configured to store sizable amounts of information, data or instructions. Disk 518 may, for example, be a mass storage device, a magnetic disk, an optical disk, a compact disk (CD), a writeable CD, a digital videodisk (DVD), a hard disk, a floppy disk, a flash memory or a memory stick. Disk 518 is coupled to bus 510.

Computer system 500 may optionally include display 512, that is, one or more devices or circuits configured to display pictures, video, text or graphics. Display 512 may be, but is not limited to, a cathode ray tube (CRT), a flat panel display, a liquid crystal display (LCD), a field emission display (FED), or a heads up display in a vehicle. Display 512 is coupled to bus 510.

Certain operations, processes and steps are discussed herein that may be realized, in some embodiments of the invention, as a series of instructions, including but not limited to codes, commands, program operation codes (op codes), pseudo codes (p-codes), firmware or software. These instructions may be executed by various components of the computer system, including, for example, processor 502, programmable controllers within communications interface 508, and programmable controllers within disk 518.

When executed, the instructions control computer system 500 such that it performs specific actions and exhibits specific behavior as described herein. Representations of these instructions may reside within, or be made available via, various media. Such media include memory devices, floppy disks, CDs, computer readable media, or information streams made available via communications interface 508, among others.

Accordingly, the invention as described herein provides a method and system which enables automatically gathering data over a period of time on locations visited by a number of people and the analysis of this data to provide coordinate information as to common locations at a particular time of two or more people. Further, it enables finding matching elements within any arbitrary sets without revealing the entire sets.

The foregoing drawing figures and descriptions are not intended to be exhaustive or to limit the invention to the forms disclosed. Rather, they are presented for purposes of illustrating, teaching and aiding in the comprehension of the invention. The invention may be practiced without the specific details described herein. Numerous selections among alternatives, changes in form, and improvements can be made without departing from the principles, spirit or essence of the invention. The invention can be modified or varied in light of the teachings herein, the techniques known to those skilled in the art, and advances in the art yet to be made.

The scope of the invention for which a patent is sought is set forth by the following claims and their legal equivalents.

What is claimed is:

1. A method of finding elements that match across a plurality of sets of global positioning system (GPS) data, the method comprising:
gathering the plurality of sets of the GPS data with two handheld portable electronic devices while users carry the two handheld portable electronic devices;
partitioning a representation of each element of a plurality of sets of the GPS data into a series of segments;
repeating a matching process to determine if the users carrying the two handheld portable electronic devices were previously at a common geographical location comprising:
exchanging portions of the GPS data between the two handheld portable electronic devices by disclosing one of the segments from each element that is from a selected one of the sets and that is a potential match;
removing from the potential matches those elements that do not match the disclosed segment; and
rotating which among the sets is the selected set;
revealing results of the matching process at the two handheld portable electronic devices.

2. The method of claim 1, and further comprising encoding the elements, wherein the encoding is selected from the group consisting of: a grid of longitude and latitude; a grid of longitude and latitude with overlapping cells; a spatial temporal grid; a spatial grid; a temporal grid; a set of cities; a set of countries; a set of names of places; and a set of attributes.

3. The method of claim 1, further comprising:
 negotiating a particular encoding; and
 encoding the elements, the encoding being in accordance with the particular encoding.

4. The method of claim 1, and further comprising applying a cryptographic hash to the elements.

5. The method of claim 4, wherein the cryptographic hash is selected from the group consisting of: an MD2 hash; an MD4 hash; an MD5 hash; a hash according to a version of an ISO/IEC 10118 standard; and a hash according to a version of a FIPS 180 standard.

6. The method of claim 4, and further comprising negotiating the cryptographic hash.

7. The method of claim 1, and further comprising:
 selecting within a plurality of ordered sequences of sets of elements those sets that have corresponding positions within the sequences; and
 applying the partitioning and the matching to the sets with corresponding positions.

8. The method of claim 7, wherein each of the sequences represents a temporarily ordered trajectory of an object that corresponds to that sequence, and the partitioning and the matching determine when the objects have been in corresponding locations.

9. The method of claim 8, wherein each set represents at least one location which the corresponding object was near at a time corresponding to that set.

10. The method of claim 1, wherein the matching process further comprises specifying which of the segments is to be disclosed in a next repetition of the matching.

11. The method of claim 1, and further comprising:
 representing each of the sets as a trie;
 wherein the potentially matching segment that is disclosed corresponds to a node at a next lower level of the trie that represents the selected set.

12. The method of claim 1, and further comprising:
 encoding, according to a particular encoding, each of the elements; and
 after the matching process, refining the particular encoding, repeating the encoding according to the particular encoding as refined, and repeating the matching process.

13. The method of claim 12, and further comprising negotiating the particular encoding and the refining of the particular encoding.

14. A non-transitory program storage medium readable by a computer, embodying a program of instructions executable by the computer for controlling a method of finding matching elements within a plurality of sets of global positioning system (GPS) data, the method comprising:
 storing portions of the plurality of sets of the GPS data in two portable electronic devices that are handheld;
 partitioning a representation of each element of a plurality of sets of the GPS data into a series of segments;
 exchanging portions of the GPS data between the two portable electronic devices to determine if users transporting the two portable electronic devices have matching GPS data gathered over a common time period by:
 disclosing one of the segments from each element that is from a selected one of the sets and that is a potential match;
 removing from the potential matches those elements that do not match the disclosed segment; and
 rotating which among the sets is the selected set;
 informing a user when the two portable electronic devices have matching GPS data gathered over the common time period.

15. The medium of claim 14, wherein the method further comprises encoding the elements, wherein the encoding is selected from the group consisting of: a grid of longitude and latitude; a grid of longitude and latitude with overlapping cells; a spatial temporal grid; a spatial grid; a temporal grid; a set of cities; a set of countries; a set of names of places; and a set of attributes.

16. The medium of claim 14, wherein the method further comprises applying a cryptographic hash to the elements.

17. The medium of claim 16, wherein the cryptographic hash is selected from the group consisting of: an MD2 hash; an MD4 hash; an MD5 hash; a hash according to a version of an ISO/IEC 10118 standard; and a hash according to a version of a FIPS 180 standard.

18. The medium of claim 14, wherein the method further comprises:
 forming a plurality of ordered sequences of sets of elements; and
 applying the partitioning and the matching to the sets having corresponding positions within each of the sequences.

19. The medium of claim 18 wherein each of the sequences represents a temporarily ordered trajectory of an object that corresponds to that sequence, and the partitioning and the matching determine when the objects have been in corresponding locations.

20. The medium of claim 19, wherein each set represents at least one location which the corresponding object was near at a time corresponding to that set.

21. The medium of claim 14, wherein the matching process further comprises specifying which of the segments is to be disclosed in a next repetition of the matching.

22. The medium of claim 14, wherein the method further comprises representing each of the sets as a trie, and wherein the potentially matching segment that is disclosed corresponds to a node at a next lower level of the trie that represents the selected set.

23. The medium of claim 14, wherein the method further comprises:
 encoding, according to a particular encoding, each of the elements; and
 after the matching process, refining the particular encoding, repeating the encoding according to the particular encoding as refined, repeating the initialization and repeating the matching process.

24. A handheld portable electronic device comprising:
 a processor configured to partition into a series of segments a representation of each element of a set of global positioning system (GPS) data; and
 a communications coupling;
 wherein the processor (1) discloses to a second handheld portable electronic device via the communications coupling one of the segments from each of the elements that is a potential match with GPS data stored in the second handheld portable electronic device, (2) receives a disclosed segment of GPS data from the second handheld portable electronic device, and (3) removes from the potential matches those elements that do not match the disclosed segment of GPS data from the second handheld portable electronic device in order to determine if a user carrying the second handheld portable electronic device and a user carrying the handheld portable electronic device have matching GPS data for a common geographical location and time.

25. The handheld portable electronic device of claim 24, wherein the portable electronic device is selected from the group consisting of: a global positioning system (GPS) receiver/recorder; a personal digital assistant (PDA); and a portable computing device.

26. The handheld portable electronic device of claim 24, wherein the coupling is selected from the group consisting of: the Internet; a private intranet; an infrared (IR) communications channel; a wireless communications channel; a serial bus; a parallel bus; a local area network (LAN); a wide area network (WAN); a modem; a public telephone switch network (PSTN); and a server.

27. The handheld portable electronic device of claim 24, wherein the portable electronic device is further configured to encode the elements, the encoding being selected from the group consisting of: a grid of longitude and latitude; a grid of longitude and latitude with overlapping cells; a spatial temporal grid; a spatial grid; a temporal grid; a set of cities; a set of countries; a set of names of places; and a set of attributes.

28. The handheld portable electronic device of claim 24, wherein the portable electronic device is further configured to apply a cryptographic hash to the elements.

29. The handheld portable electronic device of claim 28, wherein the cryptographic hash is selected from the group consisting of: an MD2 hash; an MD4 hash; an MD5 hash; a hash according to a version of an ISO/IEC 10118 standard; and a hash according to a version of a FIPS 180 standard.

30. The handheld portable electronic device of claim 25, wherein the portable electronic device is further configured to:
form a plurality of ordered sequences of sets of elements; and
apply the partitioning and the matching to the sets having corresponding positions within each of the sequences.

31. The handheld portable electronic device of claim 30, wherein each of the sequences represents a temporarily ordered trajectory of an object that corresponds to that sequence, and the partitioning and the matching determine when the objects have been in corresponding locations.

32. The handheld portable electronic device of claim 31, wherein each set represents at least one location which the corresponding object was near at a time corresponding to that set.

33. The handheld portable electronic device of claim 24, wherein the communication further includes specifying which of the segments is to be disclosed in a next repetition of the matching process.

34. The handheld portable electronic device of claim 24, wherein the devices are further configured to represent each of the sets as a trie and wherein the potentially matching segment that is disclosed corresponds to a node at a next lower level of the trie that represents the selected set.

35. The handheld portable electronic device of claim 24 wherein the devices are further configured to encode, according to a particular encoding, each of the elements and, after the matching process, to refine the particular encoding, to repeat the encoding according to the particular encoding as refined, and to repeat the matching process.

36. A method, comprising:
recording first global positioning system data points (GPS DP) during a time period in which a user carries a first portable electronic device (PED);
recording second GPS DP during the time period in which a user carries a second portable electronic device (PED);
transferring (1) a portion of the first GPS DP from the first PED to the second PED and (2) a portion of the second GPS DP from the second PED to the first PED to determine if the first and second portable electronic devices were at a common location during the time period; and
informing a user whether the first and second portable electronic devices were at the common location during the time period.

37. The method of claim 36 further comprising, determining if a match exists between the portion of the first GPS DP and the portion of the second GPS DP before exchanging more GPS data points between the first and second portable electronic devices.

38. The method of claim 36 further comprising, exchanging GPS data points between the first and second portable electronic devices to determine a city name for the common location and a calendar date for the time period.

* * * * *